July 4, 1967 W. A. RICE 3,329,759
PROCESS UTILIZING RAPID AND TRANSIENT HEATING
Filed July 15, 1963
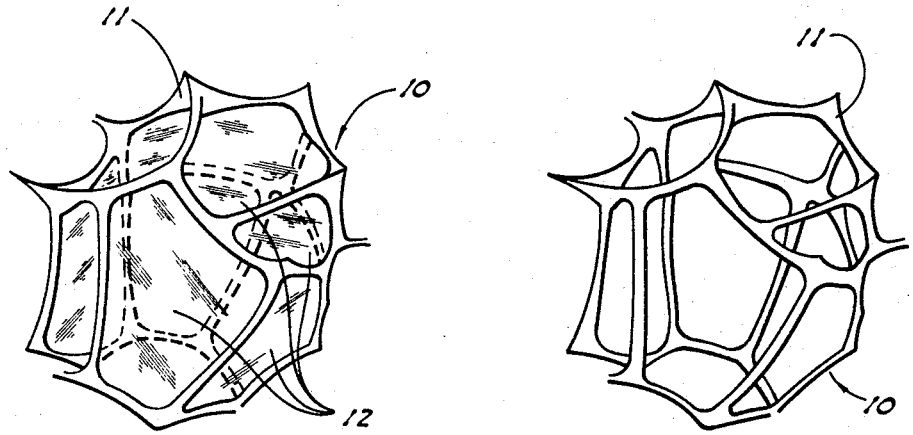
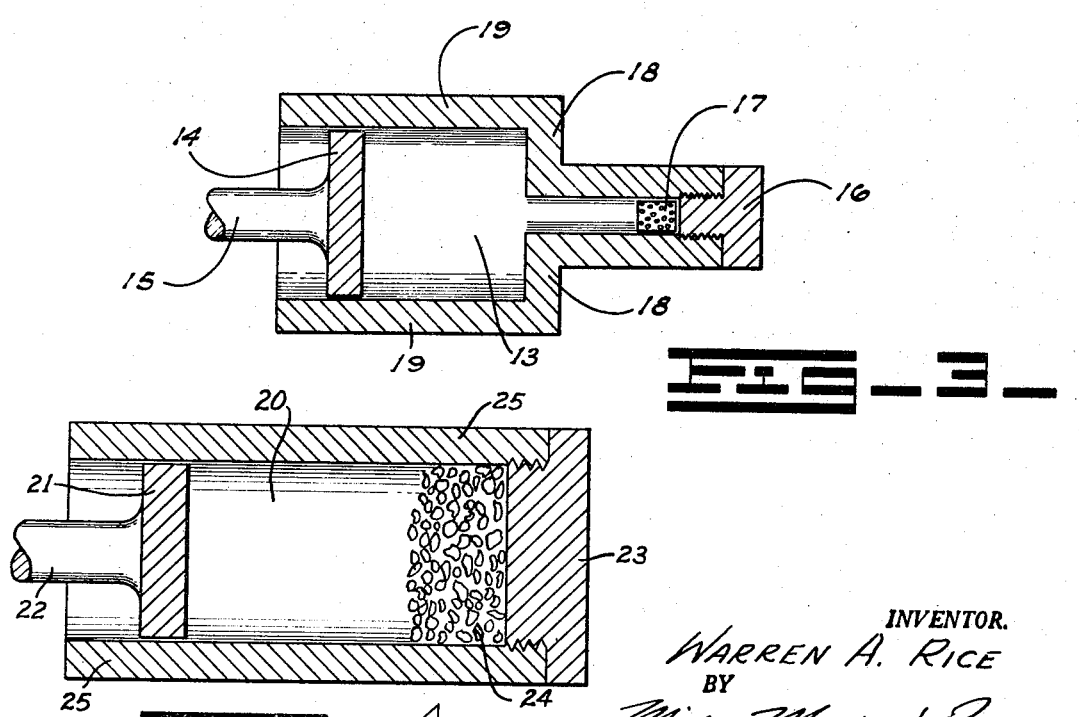
INVENTOR.
WARREN A. RICE
BY
Miller Morriss & Pappas
ATTORNEYS United States Patent Office 3,329,759
Patented July 4, 1967

1

3,329,759
PROCESS UTILIZING RAPID AND TRANSIENT HEATING
Warren A. Rice, Dexter, Mich., assignor to Chemotronics, Incorporated, Ann Arbor, Mich., a corporation of Michigan
Filed July 15, 1963, Ser. No. 294,861
14 Claims. (Cl. 264—321)

This invention relates to a process for rapidly and transiently heating the surface of a material by the use of gas compression heating. Further, this invention relates to a novel process for producing reticulated cellular materials of many different kinds and in particular to a process for producing reticulated polyurethane materials by the use of gas compression heating. Further still, this invention relates to novel products produced by the process of the present invention and in particular to novel reticulated polyurethane products.

There are many cellular materials which are well known to the prior art. These cellular materials consist of numerous individual cells which generally are constructed of a three dimensional skeletal structure of interconnected strands with membranes or windows joined to the skeletal structure such that they partition contiguous cells. The skeletal structure in these cellular materials is usually considerably thicker than the membranes or windows.

The cellular materials, particularly the organic cellular materials, produced by the prior art have found wide usage. The organic cellular materials have been found to be particularly useful in upholstering and garment applications. However, in many instances it has been found to be particularly advantageous to have the windows or membranes in these organic cellular materials removed, thereby producing a reticulated material, in order to improve their texture and breathing ability.

Thus, in recent years there has been increased demand for reticulated organic materials which are organic cellular materials which have the cell membranes or windows removed. The reticulated inorganic cellular materials are unknown to the prior art. In these reticulated organic materials the primary support for the material is supplied by the skeletal structure since the cell membranes are removed. Examples of such reticulated organic materials used by the prior art are the membrane destroyed or reticulated polyurethane materials which are used in various filtering and detraining applications and as garment liners.

In the area of reticulated organic materials, the prior art has concerned itself almost exclusively with the production of reticulated polyurethane materials, especially reticulated polyester polyurethane materials. One reason for this is that a process has not been developed which will effectively reticulate the other kinds of organic cellular materials.

An example of a prior art process for reticulating cellular polyurethane materials is one which utilizes a hydrolyzing agent such as an aqueous solution of sodium hydroxide to remove the cell membranes. While the process effectively produces a reticulated polyurethane material, there are a number of disadvantages. There are numerous time consuming, and thus expensive, steps in this process, including the neutralization of the hydrolyzing agent after application and the washing and drying of the reticulated polyurethane product. Further, this process works well only with the flexible polyester polyurethane cellular materials. Thus, relatively expensive reticulated polyurethane materials are produced by this process.

Another problem which the prior art has attempted to solve is a means of utilizing scrap or wastage from the trimming of polyurethane cellular materials. The prior art in this instance utilizes an adhesive to bond the scrap or wastage into an integral product. However, this method of bonding the pieces of polyurethane material together has a number of disadvantages. First, the adhesive is expensive and contributes very materially to the cost of the product. Second, the steps of applying and curing the adhesive are time consuming and thus expensive. Third, the product is changed in physical properties by comparison to the starting material because of the addition of the adhesive and thus the product is unsuitable for many applications.

It is therefore an object of the present invention to provide a process for producing reticulated materials of many different kinds and in particular to provide a process for producing reticulated polyurethane materials.

Further, it is an object of this invention to provide novel reticulated materials, in particular novel reticulated polyurethane materials, produced by the process of the present invention.

Further, is it an object of the present invention to provide a process for bonding materials together, in particular polyurethane materials, without the use of an adhesive, thereby producing novel, integral products which do not have the limitations imposed by an adhesive.

Further still, it is an object of the present invention to provide a process which is simple and economical.

These and other objects will become increasingly apparent to those skilled in the art as the description proceeds and by reference to the drawings.

In the drawings:
FIGURE 1 is a front view of an individual polyurethane cell, in a cellular polyurethane material, illustrating the skeletal structure and cell membranes.

FIGURE 2 is a front view of an individual reticulated polyurethane cell illustrating the skeletal structure shown in FIGURE 1 after the removal of the cell membranes.

FIGURE 3 is a schematic view of one form of equipment used in the process of the present invention.

FIGURE 4 is a schematic view of an alternate form of the equipment used in the process of the present invention without the constriction in the chamber shown in FIGURE 3.

The objects of the present invention are accomplished by providing a process for rapidly and transiently heating the surface of a material which comprises providing a material in a confined space provided with a gaseous material and rapidly increasing and decreasing the pressure in said confined space, thereby for a short period of time heating the surface of the material. Novel products are produced by the foregoing process of the present invention. The process of the present invention is particularly adapted to altering the surface characteristics of the material being treated. The process of the present invention is especially adapted to the reticulation of cellular polyurethane materials thereby producing novel reticulated polyurethane products.

Many different types of cellular organic materials were reticulated by the process of the present invention. The manufacture of the materials is well known to the prior art. Since the polyurethane cellular materials are widely used commercially and these are the preferred starting materials in the process of the present invention, the method of preparation of some of these materials by the prior art is set forth herein in detail.

Foamed or cellular polyurethane products are conventionally made by reacting an organic isocyanate, e.g. a polyisocyanate, with a polyol or a polyester along with various other materials. A gas or vapor is usually generated in situ while the reaction mixture remains in plastic or fluid state. The generation of this gas results in the formation of bubbles, approximately spherical in form, in the plastic material. As these bubbles expand, cells are formed and the resulting structure of the material is comprised of a skeletal structure and cell membranes.

Illustrative of a common prior art method of preparation of a flexible polyester polyurethane cellular material in Example I.

EXAMPLE I

Step A

Into a closed container, equipped with an agitator and means for maintaining a nitrogen gas sweep, were charged, at room temperature, 50 parts weight of an approximately 80:20 isomeric mixture of toluene-2,4-diisocyanate and toluene-2,6-diisocyanate and 50 parts by weight of a polyester resin (alkyd) (Parapfex U–148 sold by Rohm and Haas Company, Philadelphia, Pa.) having the following properties:

| | |
|---|---|
| Average molecular weight | 1800–2000 |
| Equivalent weight | 745–830 |
| Hydroxyl number | 64–75 |
| Acid number maximum | 3 |
| Water content percent maximum | 0.25 |
| Average hydroxyls per molecule | 2.42 |

The above-described mixture was agitated under a maintained nitrogen atmosphere for four hours, the temperature rising to approximately 32° C.

Step B

Eighty (80) parts by weight of the polyester resin (alkyd) referred to in Step A above, 0.6 part by weight of a polyoxyethylated vegetable oil dispersing agent (Emulphorel–719 sold by General Aniline and Film Corporation, New York city, N.Y.), 4.5 parts by weight of water and 1.9 parts by weight of diethylethanol amine were blended at room temperature.

Step C

One hundred (100) parts by weight of the reaction mixture of Step A were added to 87 parts by weight of the reaction mixture of Step B and thoroughly mixed for about 20 seconds at a starting temperature of about 25° C. The mixture was then immediately poured into a container of sufficient volume to permit expansion. After about 15 minutes the product set into a cellular mass, the temperature rising to about 75° C. The container together with the foamed cellular mass was placed in an oven and held at about 70° C. for approximately 16 hours. The product, a flexible polyester polyurethane resin, was in the form of a cellular or foamed material which was then removed from the container and cut into blocks. Materials prepared in this manner have been successfully used in the process of the present invention.

Another conventionally prepared polyurethane resin is the flexible, polyalkylene ether polyurethane cellur material. Illustrative of the method of preparation of a common type is Example II.

EXAMPLE II

Step A

Into a closed, agitated vessel, equipped with a nitrogen gas sweep, were charged, at 40° C., 100 parts by weight of a molten polyalkylene ether having a hydroxyl number of 37.6, water content of 0.04%, and melting point of about 35° C., identified as "Teracol 30" which is believed to be a 1,4-polybutylene ether glycol (E. I. DuPont and Company, Inc., Wilmington, Del.), and 12.6 parts by weight of the toluene-2,4- and 2,6-diisocyanate (80:20 mixture employed in Example I). There was a midly exothermic reaction, the temperature rising to about 45–50° C. Heat was then applied and the mixture was maintained at 60° C. for two and one-half hours. An additional 12.6 parts of the isomeric diisocyanate mixture was then added and the temperature was raised and maintained at 140° C. for an additional two and one-half hours. The charge was then cooled at 50° C. and a further 3.7 parts by weight of the isomeric mixture of the diisocyanate was added to the reaction mixture. Finally, the product was allowed to cool to room temperature of about 25° C.

Step B

A blend, at 30° C., was prepared of 51 parts by weight of dioctyl sebacate, a plasticizer-softener; 10 parts by weight of n-methyl-morpholine and 2.5 parts by weight of triethylamine catalyst; 5.0 parts by weight of a conventional silicone foam stabilizer (Dow Corning DC–200, dimethyl polysiloxane fluid, 50 cstks.); and 22.5 parts by weight of water.

Step C

To the reaction mixture of Step B were added 1000 parts by weight of the reaction mixture of Step A, and the mixture was stirred rapidly for about 20 seconds. Immediately thereafter the mass was poured into a container of sufficient volume to permit expansion; and after about 30 minutes the container together with the foamed mass was placed in an oven and maintained at 70° C. for about 16 hours. The product was a polyalkylene ether polyurethane resin, in the form of an open cellular structure which was removed from the container and cut into blocks. Materials made in this manner were also used in the process of the present invention.

Examples I and II illustrate conventional processes for the preparation of polyester and polyether polyurethane cellular materials utilized by the prior art. These and other polyurethane materials (e.g., the so-called "one-shot" polyether polyurethanes) were treated by the process of the present invention. It will be appreciated that there are many different types of cellular polyurethane materials. These will be rigid, semi-rigid or flexible depending upon the starting material used. There are many variations in the isocyanate materials used. These isocyanate materials were reacted with many different materials containing an active hydrogen to produce a cellular polyurethane material. Further, it will be appreciated that Examples I and II are only illustrative of conventional processes of preparation of cellular polyurethane materials. The production of cellular polyurethane materials of isocyanate derived polymers of various types is well understood in the polymer art and is described for example in "German Plastics and Practice" published by DeBell and Richardson 1946, Chapter 21, "Plastic Foams", pages 462–465; "Papers Presented at the Atlantic City Meeting: Synthesis of Isocyanate Polymers" published by the American Chemical Society, Division of Paints, Plastics and Printing Ink Chemistry, September 1956; and in the patent literature.

Cellular materials (organic or inorganic) having interconnected cells and having a melting point, or volatilization temperature, at or below the temperature produced by gas compression, can be employed as starting materials to produce reticulated materials by the process of the present invention. The interrelated factors determining whether a cellular material can be reticulated are: the volatilization, decomposition, depolymerization and/or melting temperatures of the material being reticulated; the temperature produced by the gas compression (which must be at least equal to the volatilization, decomposition, depolymerization and/or melting temperature of the material being reticulated); the relationship between the heat capacity of the membranes in the cellular material and the heat capacity of the intersections or strands formed at the junctures of two or more membranes; the heat-transmissive properties of the material being reticulated; and the caloric value of the gas heated by compression which must be sufficient to raise the temperature of the membranes to the destruction point without being sufficient to also destroy the strands, taking into account the specific heat and thermal conductivity of the material being reticulated and the time-temperature curve of the gas compression. Within the limitations imposed by these factors the following materials, for example, can be treated by the process of the present invention: organic expanded materials such as polystyrene, polyethylene, vinyl resin (plasticized poly (vinyl chloride)), cellulose acetate, natural rubber and synthetic rubber cellular materials; and inorganic expanded materials such as metal foams and glass foams.

The preferred cellular materials used to produce the reticulated materials of the present invention are the polyurethane cellular materials. FIGURE I illustrates an individual cell 10 in a polyurethane cellular material produced by a process such as that of Examples I and II. It comprises a skeletal structure 11 and cell membranes 12. The skeletal structure 11 supports the cell membranes 12 and the combination forms an individual cell 10. When the cell membranes 12 are removed, a reticulated material is produced. FIGURE II illustrates the cell 10 shown in FIGURE I after complete reticulation. Only the skeletal structure 11 is left after reticulation.

The preferred process of the present invention and the products produced thereby is illustrated by the following Examples III–IX. Further, the preferred process for reticulating cellular polyurethane materials and the novel products produced thereby is particularly illustrated.

EXAMPLE III

Referring to the schematic diagram shown in FIGURE III, a chamber 13, defined by the wall 19, was provided to hold a sample 17 at one end. The chamber 13 was fitted at one end with a moveable piston 14 in relatively gas tight fit or seal with the chamber 13. The piston 14 was provided with a driving arm 15 such that the piston 14 could be cyclicly and linearly moved to compress and decompress a gas inside the chamber 13. At the opposing end of the chamber 13 a cover 16 was provided which sealed that end of the chamber 13. As illustrated in FIGURE III the chamber 13 was provided with a constriction 18 between the sample 17 end and the piston 14 end of the chamber 13. This is a preferred form because the sample 17 is kept from direct contact with the piston 14. It is preferable to make the chamber and piston of materials having low thermal conductivity, or to so line or cover the portions of those parts in contact with the compressed gas, so that heat losses from the compressed gas to the compression device are kept minimal; each device must be adjusted for compression ratio to compensate for this effect on that particular device, and with regard to the amount of gas being compressed and the size and type of specimen being reticulated.

A sample 17 of cellular polyurethane material 1 inch in diameter and 1 inch thick was positioned in the chamber 13 as illustrated in FIGURE III. The closed chamber 13 was filled with air at atmospheric pressure. The sample 17 was a charcoal colored, flexible polyester polyurethane cellular material of about 2.0 pounds per cubic foot density, and contained about 45 cells per linear inch.

The piston 14 was moved inward rapidly by the driving arm 15 and then rapidly withdrawn to its rest position. The complete cycle of compression and decompression of the gas in the chamber 13 was accomplished in about 0.03 of a second. The gas was compressed in a ratio of not less than about 10:1, final chamber volume to initial chamber volume, respectively.

After the compression-decompression cycle was complete, the sample was flushed with clean air to remove any gaseous products formed from the cellular polyurethane material due to the compression.

The sample was then examined and it was found to be reticulated. The sample was the same charcoal color and was undamaged by the compression-decompression cycle.

The process of Example III was repeated using polyester polyurethane cellular materials having a larger number of cells per linear inch. Illustrative is Example IV.

EXAMPLE IV

The process of Example III was repeated using a flexible polyester polyurethane sample, which contained about 60 cells per linear inch, which was light green in color and which measured 1 inch in diameter by about 1 inch thick.

The sample was positioned in the chamber 13 and the compression-decompression cycle of Example III repeated. The gas in the chamber 13 was compressed in a ratio of not less than about 12:1 final chamber volume to initial chamber volume, respectively.

After the compression-decompression cycle was complete, the sample was flushed with clean air to remove any gaseous products formed from the cellular polyurethane material due to the compression.

The sample was then examined and it was found to be reticulated. The sample was the same green color and was undamaged by the compression-decompression cycle.

The process of Example III was repeated using an about 100 cell per linear inch polyester polyurethane cellular material. Illustrative is Example V.

EXAMPLE V

The process of Examples III and IV was repeated using a pink colored, flexible polyester polyurethane cellular material containing about 100 cells per linear inch which measured 1 inch in diameter and 1 inch thick. The air in the chamber 13 containing this sample was taken through a compression-decompression cycle in about 0.02 second. The gas was compressed in a ratio of not less than about 15:1 final chamber volume to initial chamber volume, respectively.

The sample was flushed with air and examined. It was found to reticulated. The color was unchanged and the sample was comparable in all respect to that produced in Example III.

The process of Example III was repeated using a polyester polyurethane cellular material with fewer calls per linear inch. Illustrative is Example VI.

EXAMPLE VI

The procedure of Example III was repeated using a tan colored, flexible polyester polyurethane cellular material which contained 10 cells per linear inch and which measured 1 inch in diameter and 1 inch thick.

The sample was positioned in the chamber 13 and taken through a compression-decompression cycle in about 0.03 second. The gas in the chamber was compressed in a ratio of not less than about 10:1, respectively, final chamber volume to initial chamber volume.

The sample was flushed with clean air and examined. It was found to be reticulated and comparable to that produced in Example III. The color was unchanged.

The process of Examples III–VI was repeated using a flexible polyether polyurethane cellular material. Illustrative are Examples VII and VIII.

EXAMPLE VII

The procedure of Examples III–VI was repeated using a yellow colored, flexible, prepolymer type polyether polyurethane cellular material, having cells ranging between about $\frac{1}{20}$ inch to about $\frac{1}{100}$ inch in diameter with a random distribution of cell sizes which measured 1 inch in diameter by 1 inch thick.

The sample was positioned in the chamber 13 and subjected to a compression-decompression cycle of about 0.03 second. The compression ratio was not less than about 10:1 fiinal chamber volume to initial chamber volume, respectively.

The sample was flushed with celan air and examined. It was found that the sample was reticulated and the color was unchanged. The sample was comparable in all respects to that produced in Example III.

EXAMPLE VIII

The process of Example VII was repeated using a flexible white "one shot" polyether polyurethane, having cells about 1/100 inch in diameter. The sample measured 1 inch in diameter by 1 inch thick. The compression cycle was complete in about 0.03 second and the compression ratio was not less than about 9:1 final chamber volume to initial chamber volume, respectively. It was found that the sample was completely reticulated, unchanged in color and comparable to that produced in Example III.

The process of Example III was repeated using different types of cellular polyurethane materials including semi-rigid and flexible polyurethane materials and cellular polyurethane materials containing flame or fire retardants or germicides and it was found that they were easily reticulated by the process of the present invention. In particular, it was found that all cell sizes and colors and compositions of the interconnected or "open-celled" cellular polyurethane materials could be treated by the process of the present invention to produce a reticulated material.

It will be appreciated that partial reticulation can be accomplished and controlled by using compression ratios lower than those required for total reticulation and by using a number of compression-decompression cycles. It was intended that this variation be included within the scope of the present invention.

It was found that as the number of cells per linear inch in the cellular material increase, the temperature of the gaseous material had to be increased by increasing the pressure in the compression portion of the compression-decompression cycle. It is believed that the proportionately greater ratio of the cell surface area to cell volume of the smaller cells produces a requirement of more heat energy per cell to cause reticulation. It was found that the temperature of the gas could easily be regulated by increasing or decreasing the compression ratio. This can be seen from Examples III–VIII.

The compression heating portion of the cycle is based upon the well known gas laws as defined by the formula $PV=nRT$ where P is the pressure, V is the volume, T is the temperature and the $nR$ are constants. As the pressure on the gas is increased and the volume of the gas is reduced the temperature of the gas increases. The decompression cooling portion of the cycle follows the reverse of the above sequence. Thus as the pressure is decreased, the volume of the gas is increased and the temperature of the gas decreases. The unconventional feature of the present invention is the rapidity of the gaseous compression-decompression cycle. Thus the whole cycle is preferably completed in 0.3 of a second or less.

As can be seen from the foregoing Examples III–VIII the process of the present invention depends upon the rapid heating of the gas due to the compression to accomplish partial heating of the material treated to at least the thermoplastic point. Since the heating is relatively brief, the bulk of the material is not appreciably heated. Thus the heating of the material treated is essentially limited to its surfaces. In the case of the cellular materials where the membranes are very thin, these membranes are heated to the point where they melt, decompose and/or volatilize. In the thicker materials the surface is heated to at least its thermoplastic point which is sufficient to cause bonding between contacting pieces of material.

The process of the present invention can be used to bond pieces of various materials together. Further the process of the present invention can be used to bond pieces of cellular materials as well as to reticulate them at the same time. By the use of the process of the present invention a bonded product can be produced simply and economically. Illustrative is Example IX.

EXAMPLE IX

The equipment of Example III was used and mounted vertically with the sample 17 end down. The chamber 13 at the sample 17 end was packed with pieces of "one-shot" polyether polyurethane scrap of many different colors. The chamber 13 was mounted vertically in order to retain the scrap in the sample 17 end.

The gas was taken through a compression-decompression cycle in about 0.3 second. The gas was compressed in a ratio of not less than about 13:1 final volume to initial volume, respectively.

The sample was flushed with clean air. It was then examined and found to be reticulated and strongly bonded together.

In the equipment shown in FIGURE 3, it was found that it was advantageous to pack the pieces of the polyurethane material into the sample 17 end of the chamber 13. In the equipment shown in FIGURE 4, it was preferred to allow the piston 21 with the driving arm 22 to compress the foam in the sample 24 end of the chamber 25 with the cover 23 as well as the gas in the space 20 between the piston 22 and chamber 25, by eliminating the constriction 18 as shown in FIGURE 3.

The process of Example IX was repeated using other types of cellular materials with good result. It was found in all instances that the result was a bonded product.

The product from the bonding of pieces of material by the process of the present invention finds a ready market. Further, this process provides a means of utilizing waste resulting from the trimming of cellular materials or reticulated materials. In conventional polyurethane cellular material trimming operations, there is about 20% wastage in scrap. Thus, the process of the present invention provides a means of economically and simply bonding together scrap cellular or reticulated polyurethane materials to produce a marketable product.

A further advantage of the bonding process is that the final product ca be formed or molded to any desired shape conforming to the configuration of the sample end of the chamber. Thus, consumer specifications as to shape can easily be met by the use of the process of the present invention.

It was found that the reticulated polyurethane products of the present invention had physical properties which were superior to the prior art reticulated materials or the starting cellular material. This is believed to result from the heating of the surfaces of the skeletal structure due to the compression of the gas.

It will be appreciated that contacting pieces of materials, particularly organic and inorganic fiber materials can be bonded by the process of the present invention. Illustrative is Example X.

EXAMPLE X

The chamber 13 at the sample 17 end was packed with fiber-glass such that the fibers were in contact.

The compression-decompression cycle was repeated in about 0.02 second. The gas was compressed in about a 30:1 ratio final chamber volume to initial chamber volume, respectively.

The sample was removed from the chamber 13. It was found that the intersections were tightly bonded.

The process of Example X was repeated using many other materials including fibers. Illustrative of the materials that can be bonded by the process of the present invention are the following: nylon, vinyl, epoxy, acrylic, polyurethane, and polyester materials, including fibers, for instance. All of these materials were bonded with good result.

It will be appreciated from the foregoing examples that the process of the present invention is very rapid. The compression-decompression cycle takes much less than a second. There is no washing or drying step as seen for instance in the prior art process for reticulating polyester polyurethane by the use of a hydrolysis method. These factors very materially contribute to a reduction in equipment and labor costs, resulting in a process which is simple and economical.

Other equipment for creating the compression-decompression cycle can be used. Equipment variations are within the skill of the art and are intended to be included within the scope of the present invention.

It will be appreciated that air at ambient temperature was used at an initial pressure of about atmospheric in the chamber. However it will be appreciated that higher starting pressures can be used with or without higher initial air temperatures. However, little advantage is gained by the use of higher initial pressures and it is preferred to use an initial pressure of about atmospheric pressure.

It will be appreciated that air was the gaseous material used in the compression-decompression cycle. Air is preferred for economic reasons. It will be appreciated however that there are many other gases that can be used such as: nitrogen, argon, helium, neon, xenon, krypton and the like. The only limitation on the gaseous material is that it heat sufficiently upon compression to heat the material being treated to its thermoplastic point.

In certain instances various solvents or their vapors can be used to treat the various organic materials in order to reduce the temperatures needed from the compression portion of the compression-decompression cycle. Thus for instance the temperature in the compression cycle can be reduced in the reticulation of polyurethane cellular materials by pretreatment with solvents such as tetrahydrofuran or dimethyl formamide. All of these variations are intended to be included within the scope of the present invention.

It will be appreciated that slower compression cycles than 0.3 second can be used, providing the temperature produced by the compression is sufficiently high to compensate for heat losses to the surroundings and/or the system is well insulated. If the material is heated for too long a time however, it will be deformed or destroyed. Thus in any event the heating must be rapid and transient. It will be appreciated therefore that a compression-decompression cycle of 0.3 second or less is preferred.

It will be appreciated that the process of the present invention can be repeated as many times on a single sample as is necessary to alter the surface characteristics of the sample.

The term "thermoplastic" as used in this specification means the state of a solid material where it becomes soft enough to fuse or bond to a contacting material.

It will be appreciated that the process of the present invention can be used to heat the surfaces of many different materials to alter the physical or chemical characteristics. For example, the surface of catalysts can be regenerated by the process of the present invention without affecting the bulk of the material. All these variations are within the scope of the present invention.

The reticulated materials of the present invention are formed from a thermoplastic material in open-cellular form by treating cellular materials and by bonding pieces and fibers of material together. The term "recticulate" means forming a network or web.

It will be appreciated that the foregoing description is only illustrative of the present invention and it is intended that this invention be limited only by the hereinafter appended claims.

I claim:
1. The process for producing a reticulated material which comprises:
  (a) providing in a confined space a gaseous material in contact with the surfaces of a thermoplastic material in open cellular form which when heated to its thermoplastic point will form a reticulated material;
  (b) rapidly increasing the pressure on and decreasing the volume occupied by the gaseous material sufficient to heat the surfaces of the thermoplastic material to at least the thermoplastic point to produce the reticulated material; and
  (c) rapidly decreasing the pressure on and increasing the volume occupied by the gaseous material in the confined space so that the reticulated material produced is not destroyed by the heat.

2. The process of claim 1 wherein the reticulated material is formed from contacting strands of thermoplastic material which are rendered thermoplastic at their points of contact by the heating and bond together to produce the reticulated material.

3. The process of claim 2 wherein the strands of thermoplastic material are composed of fiber glass.

4. The process of claim 1 wherein the reticulated material is formed from contacting pieces of thermoplastic material which are rendered thermoplastic at their points of contact by the heating and bond together to produce the reticulated material.

5. The process of claim 3 wherein the pieces of thermoplastic material are composed of an organic material.

6. The process of claim 1 wherein the reticulated material is formed from a cellular thermoplastic material with interconnected cells and having a three dimensional skeletal structure of interconnected strands which are rendered thermoplastic by the heating to produce the reticulated material.

7. The process of claim 1 wherein the reticulated material is formed from a cellular thermoplastic material with interconnected cells and having a skeletal structure of interconnected strands with membranes joined to the skeletal structure such that they partition contiguous cells and wherein the membranes are destroyed by the heating to at least the thermoplastic point to produce the recticulated material.

8. The process of claim 7 wherein the reticulated material is composed of an organic material.

9. The process of claim 8 wherein the organic material is a polyurethane.

10. The process of claim 7 wherein the reticulated material is formed from contacting pieces of a cellular thermoplastic material with interconnected cells and having a skeletal structure of interconnected strands with membranes joined to the strands such that they partition contiguous cells, and wherein the membranes are destroyed and the pieces of the cellular material are rendered thermoplastic at their points of contact by the heating and bond together to produce the reticulated material.

11. The process of claim 1 wherein the thermoplastic material is composed of an organic material and is pretreated with a solvent to lower the thermoplastic point of the organic material.

12. The process of claim 1 wherein the volume occupied by the gaseous material in the confined space is reduced to at least $\frac{1}{10}$ the initial volume by the increase of pressure on the gaseous material.

13. The process of claim 1 wherein the increase and decrease of pressure on the gaseous material is accomplished in less than 0.3 second.

14. The process of claim 1 wherein the gaseous material is air.

References Cited
UNITED STATES PATENTS

| | | | |
|---|---|---|---|
| 2,271,829 | 2/1942 | Powers | 264—125 XR |
| 3,157,498 | 11/1964 | Zernow et al. | 75—226 |
| 3,175,025 | 3/1965 | Geen et al. | 264—321 XR |
| 3,196,975 | 7/1965 | Voelker | 264—321 XR |
| 3,226,339 | 12/1965 | Frilette et al. | 252—455 |
| 3,239,585 | 3/1966 | Karpovich et al. | 264—321 XR |

(Other references on following page)

FOREIGN PATENTS

| | | |
|---|---|---|
| 675,254 | 12/1963 | Canada. |
| 67,207 | 2/1893 | Germany. |
| 688,312 | 3/1953 | Great Britain. |
| 981,203 | 1/1965 | Great Britain. |
| 996,629 | 6/1965 | Great Britain. |

OTHER REFERENCES

Sneeden, J-B. O., Applied Heat for Engineers, London, Blackie and Son, 1959, pp. 148–150.

British Plastics, "Current Development in Foamed Polyurethanes," January 1956, pp. 5–8.

Levin, E. M., Phase Diagrams for Ceramists, Columbus, Ohio, American Ceramic Society, 1956, p. 148.

ALEXANDER H. BRODMERKEL, *Primary Examiner.*

ROBERT F. WHITE, *Examiner.*

P. E. ANDERSON, *Assistant Examiner.*